United States Patent
Wu

(10) Patent No.: US 8,275,006 B2
(45) Date of Patent: Sep. 25, 2012

(54) METHOD AND APPARATUS FOR BINDING TRANSMISSION LINES

(75) Inventor: Haijun Wu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 857 days.

(21) Appl. No.: 11/628,600

(22) PCT Filed: May 29, 2006

(86) PCT No.: PCT/CN2006/001142
§ 371 (c)(1),
(2), (4) Date: Jul. 19, 2007

(87) PCT Pub. No.: WO2006/128370
PCT Pub. Date: Dec. 7, 2006

(65) Prior Publication Data
US 2007/0280284 A1    Dec. 6, 2007

(30) Foreign Application Priority Data
May 30, 2005 (CN) .......................... 2005 1 0073404

(51) Int. Cl.
*H04J 3/04* (2006.01)
(52) U.S. Cl. ........ 370/536; 370/358; 370/391; 370/394; 370/468; 370/535; 370/542
(58) Field of Classification Search .................. 370/394, 370/435, 468, 358, 391, 535, 536, 542–544
See application file for complete search history.

(56) References Cited

U.S. PATENT DOCUMENTS

| | | | |
|---|---|---|---|
| 5,608,733 A * | 3/1997 | Vallee et al. .................. | 370/394 |
| 5,999,563 A | 12/1999 | Polley et al. | |
| 6,137,839 A | 10/2000 | Mannering et al. | |
| 7,406,042 B1 * | 7/2008 | Shridhar et al. ............... | 370/230 |
| 2002/0154637 A1 | 10/2002 | Keller-Tuberg | |
| 2003/0107999 A1 | 6/2003 | Peleg et al. | |
| 2003/0133456 A1 | 7/2003 | Beck | |
| 2004/0068589 A1 * | 4/2004 | Witkowski et al. ........... | 709/249 |
| 2005/0265376 A1 * | 12/2005 | Chapman et al. .............. | 370/461 |

FOREIGN PATENT DOCUMENTS

CN    1578237    2/2005
(Continued)

OTHER PUBLICATIONS

The ATM Forum Technical Committee, Inverse Multiplexing for ATM (IMA) Specification Version 1.1, AF-PHY-0086.001, Mar. 1999.*

(Continued)

*Primary Examiner* — Hoon J Chung

(57) ABSTRACT

Embodiments of the present invention disclose a method for binding transmission lines and the method includes the following steps: first decide a transmission speed supported by all the transmission lines to be bound, activate all the transmission lines to be bound at the transmission speed supported by all the transmission lines and then bind all the transmission lines. Apparatus for binding transmission lines is also disclosed in the embodiments, which includes a speed reselecting module, a reactivating module and a binding module. According to the embodiments of the present invention, transmission lines with different transmission speeds are bound together in such a way that transmission lines with different transmission speeds could be activated at one transmission speed. Therefore, the bound transmission line may provide wider bandwidth for the user because all the bound transmission lines have the same transmission speed.

9 Claims, 2 Drawing Sheets

FOREIGN PATENT DOCUMENTS

CN  1815986  8/2006
EP  1253755 A2  10/2002

OTHER PUBLICATIONS

Chinese Office Action for Chinese Patent Application No. 2005100734044, dated Oct. 10, 2008, with English translation thereof.

"Inverse Multiplexing for ATM (IMA) Specification Ver. 1.1"; ATM Forum Technical Committee; Mar. 1, 1999; pp. 1-185; XP002233772.

Supplemental European Search Report for European Patent Application No. 06 74 2030.7, dated May 21, 2007.

European Office Action for European Patent Application No. 06742030.7, dated Jun. 30, 2008.

European Oral Proceedings for European Patent Application No. 06742030.7, dated Jun. 4, 2009.

Written Opinion of the International Searching Authority for International Patent Application No. PCT/CN2006/001142, dated Oct. 19, 2006.

Chinese Office Action for Chinese Patent Application No. 200510073404.4, dated Mar. 11, 2010, and partial English translation thereof.

* cited by examiner

METHOD AND APPARATUS FOR BINDING TRANSMISSION LINES

FIELD OF THE TECHNOLOGY

The present invention generally relates to the network communication technology, and more particularly, to a method and apparatus for binding transmission lines.

BACKGROUND OF THE INVENTION

At present, a user interface board of broadband access device based on digital subscriber line (XDSL) technology can provide various access methods, for example, one or more than one of the following methods, Asymmetric Digital Subscriber Line (ADSL), Very High-Bit Rate Digital Subscriber Line (VDSL), Ethernet, Symmetric High-Bit Rate Digital Subscriber Line (G.shdsl), and etc. Meanwhile, a broadband access device may provide a plurality of user interface boards.

With development of various xDSL techniques towards wider bandwidth and higher speed, the requirements on the bandwidth and speed of xDSL lines become higher and higher. To meet such requirements, a method currently used is increasing the speed on a single pair and, meanwhile, increasing the transmission bandwidth by increasing extra high-frequency points. However, according to the transmission theory, higher frequency band means faster attenuation speed. Therefore, in the case of long distance, data transmission still depends on signals in lower frequency band. As a result, the available bandwidth of the xDSL line is decreased dramatically with the increase of the line length.

Another method for meeting such requirements is providing wider bandwidth by binding multiple lines. That is, multiple pairs of lines are provided for one user, and meanwhile, the speed of each pair of lines may be increased. In order to ensure the binding of multiple pairs of lines, however, the transmission speed of each pair of lines has to be set as the same. In actual applications of DSL techniques, however, the activated speed of each pairs of lines with equal length from the same original point to the same destination point is variant due to various factors, such as wireless wave, ambient humidity, and other factors bringing changes to line resistances and ground balance. Therefore, the activated speeds of the multiple pairs of lines from the same Central Office (CO) to the same remote user may be different. As a result, it is impossible to provide a user with a bandwidth by simply binding the multiple pairs of lines.

SUMMARY OF THE INVENTION

In view of the above, embodiments of the present invention provide a method and apparatus for binding transmission lines to achieve binding of lines with different speeds, and provide wider transmission bandwidth for the user.

A method for binding transmission lines includes the following steps:

Deciding a transmission speed supported by all the transmission lines to be bound, activating all the transmission lines to be bound at the transmission speed supported by all the transmission lines, and then binding all the transmission lines.

The step of deciding a transmission speed supported by all the transmission lines includes obtaining the current activated speeds of all the transmission lines which have been activated and are to be bound, selecting the lowest activated speed from the current activated speeds of all the transmission lines, and determining the lowest activated speed as the transmission speed supported by all the transmission lines.

The step of activating all the transmission lines at the transmission speed supported by all the transmission lines includes activating all the transmission lines at the transmission speed supported by all the transmission lines according to a line profile of the transmission speed supported by all the transmission lines to be bound.

An apparatus for binding transmission lines includes:

a speed reselecting module, for selecting a transmission speed supported by all the transmission lines to be bound and sending the transmission speed;

a reactivating module, for setting the transmission speeds of all the transmission lines to be bound to the transmission speed sent by the speed reselecting module, and sending out a binding instruction; and a binding module, for binding all the transmission lines to be bound after receiving the binding instruction sent by the reactivating module.

The speed reselecting module mainly includes an upstream bandwidth reselecting module and a downstream bandwidth reselecting module, wherein the upstream bandwidth reselecting module, upon activating all the transmission lines, selects the lowest upstream bandwidth from all the upstream bandwidth of all the transmission lines, and then sends the lowest upstream bandwidth to the reactivating module, and the downstream bandwidth reselecting module, upon activating all the transmission lines, selects the lowest downstream bandwidth from all the downstream bandwidth of all the transmission lines, and then sends the lowest downstream bandwidth to the reactivating module.

The apparatus further includes a bind-sending module and a bind-receiving module, wherein the bind-sending module serves to store a bind-sending rule thereof, selects a transmission line for a service to be sent according to the bind-sending rule, and then sends the service to the peer side device via the selected line, and the bind-receiving module serves to store a bind-sending rule of the peer side device and receives the service from the peer side device according to the bind-sending rule of the peer side device.

In comparison with the prior art, according to the embodiments of the present invention, the transmission speed supported by all the transmission lines is decided, all the transmission lines are activated at the transmission speed supported by all the transmission lines, and all the transmission lines are bound. In this way, transmission lines with different transmission speeds could be activated at the same transmission speed. Therefore, the bound transmission lines may provide wider bandwidth for the user because all the transmission lines have the same transmission speed.

EMBODIMENTS OF THE INVENTION

In an embodiment of the present invention, first the transmission speed supported by all the transmission lines is determined, then all the transmission lines are activated at the transmission speed supported by all the transmission lines and last all the transmission lines are bound.

Figure 1:
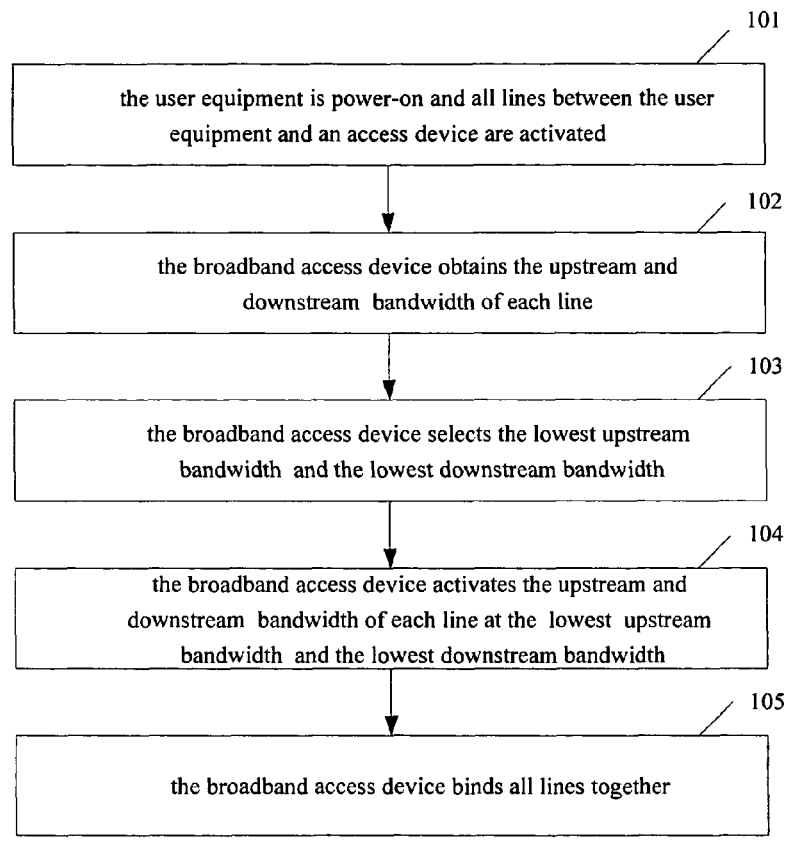
FIG. 1 is a flowchart of binding transmission lines according to an embodiment of the present invention.

FIG. 1 is a flowchart of binding transmission lines according to an embodiment of the present invention. As shown in FIG. 1, the detailed steps are as follows:

Step 101: The user equipment is power-on and all the lines between the user equipment and a broadband access device are activated.

The line interfaces that the broadband access device provides for the same user may be any combination of a DSL interface, such as ADSL, VDSL, ADSL+, etc, and an Ethernet interface, such as FE, GE, etc. Each line corresponds to an activated speed and the activated speed of each line may not be the same.

Step 102: The broadband access device obtains the upstream bandwidth and the downstream bandwidth of each line.

Step 103: The broadband access device selects the lowest upstream bandwidth and the lowest downstream bandwidth from the obtained upstream bandwidth and downstream bandwidth of all the lines.

Step 104: The broadband access device re-activates the upstream bandwidth and downstream bandwidth of each line at the lowest upstream bandwidth and the lowest downstream bandwidth according to a line profile of the lowest upstream bandwidth and the lowest downstream bandwidth.

Step 105: The broadband access device binds all the lines together.

After binding all the lines, when sending data, the broadband access device or the user equipment may select a line from the bound lines according to a preset binding rule. A data packet may be sent to the peer side device via the selected line and then, the peer side device receives the service from the sending side device according to the binding rule adopted by the sending side device.

Herein, the upward lines and the downward lines between the user equipment and the broadband access device may adopt either the same binding rules or different binding rules. However, the user equipment needs to store the binding rules of the downward lines to receive the service from the broadband access device according to the binding rules. At the same time, the broadband access device needs to store the binding rules of the upward lines to receive the service from the user equipment according to the binding rules. For example, suppose four DSL lines exist between the user equipment and the broadband access device and are numbered respectively as line 1, 2, 3 and 4. Upon binding the four lines, the binding rule of the upward lines is set as using each of the lines in turn for data transmission. That is, the first data packet from the user equipment is transmitted via the line 1, the second data packet from the user equipment is transmitted via the line 2, and the rest may be inferred. Correspondingly, when receiving the data packets sent by the user equipment, the broadband access device needs to receive a data packet on the line 1 first and then receive a data packet on the line 2, and the rest may be inferred. In this way, it is ensured to receive data packets orderly and reliably.

Figure 2:
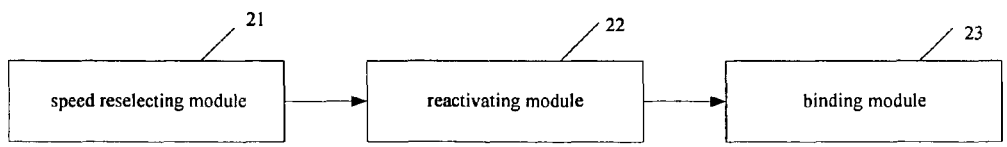
FIG. 2 is a block diagram illustrating an apparatus for binding transmission lines according to an embodiment of the present invention.

FIG. 2 is the first block diagram illustrating an apparatus for binding transmission lines according to an embodiment of the present invention. As shown in FIG. 2, the apparatus mainly includes a speed reselecting module 21, a reactivating module 22 and a binding module 23.

Speed reselecting module 21 selects the transmission speed supported by all the lines to be bound according to the transmission speeds of all the lines to be bound, and then sends the selected transmission speed to reactivating module 22. Reactivating module 22 sets the transmission speed of each line to be bound to the transmission speed sent by speed reselecting module 21, and then sends a binding instruction to binding module 23.

Upon receiving the binding instruction sent by reactivating module 22, the binding module 23 binds all the lines to be bound together.

Figure 3:
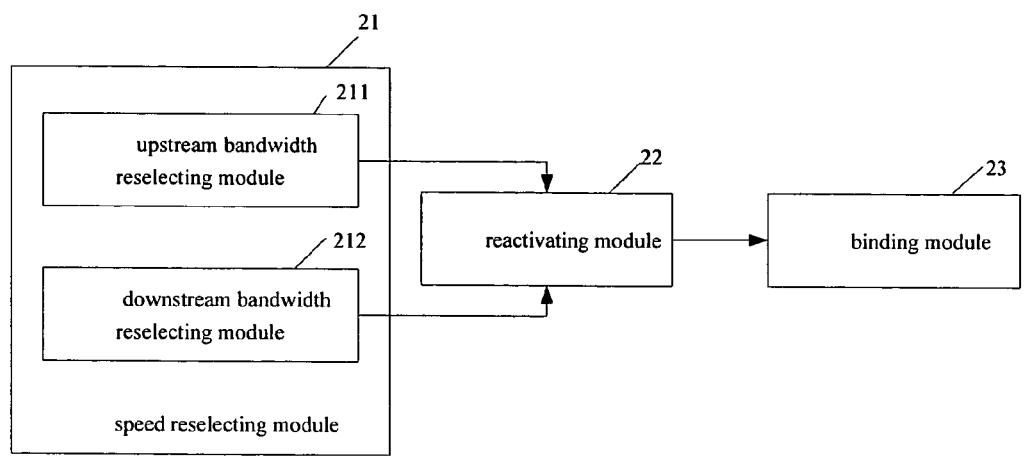
FIG. 3 is a block diagram illustrating an apparatus for binding transmission lines according to another embodiment of the present invention.

Furthermore, as shown in FIG. 3, speed reselecting module 21 mainly includes an upstream bandwidth reselecting module 211 and a downstream bandwidth reselecting module 212, wherein, upon activating all the transmission lines to be bound, upstream bandwidth reselecting module 211 selects the lowest upstream bandwidth from the upstream bandwidth of all the transmission lines to be bound, and then sends the selected lowest upstream bandwidth to reactivating module 22, and upon activating all the transmission lines, downstream bandwidth reselecting module 212 selects the lowest downstream bandwidth from the downstream bandwidth of all the transmission lines, and then sends the selected lowest downstream bandwidth to reactivating module 22.

Specifically, reactivating module 22 reactivates the upward and downward speed of each line to be bound at the lowest upward and downward speed sent by the speed reselecting module 21, and then sends the binding instruction to binding module 23.

In actual applications, reactivating module 22 is typically located in a hardware processing unit of the broadband access device. Speed reselecting module 21 may be located either in a software processing unit of the broadband access device or in the hardware processing unit of the broadband access device.

Figure 4:
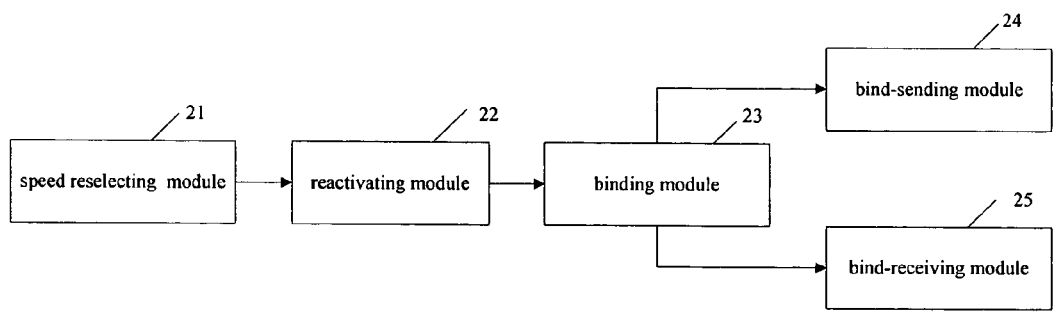
FIG. 4 is a block diagram illustrating an apparatus for binding transmission lines according to another embodiment of the present invention.

FIG. 4 is the third block diagram illustrating an apparatus for binding transmission lines according to an embodiment of the present invention. As shown in FIG. 4, in comparison with FIG. 2, the apparatus further includes a bind-sending module 24 and a bind-receiving module 25.

The bind-sending module 24 serves to store a bind-sending rule thereof. Upon receiving a bind-finish instruction sent by binding module 23, if it is needed to send a data packet, bind-sending module 24 selects a transmission line for the data packet to be sent according to the bind-sending rule thereof, and then sends the data packet to the peer side device via the selected line.

Bind-receiving module 25 serves to store a bind-sending rule of the peer side device. Upon receiving the bind-finish instruction sent by binding module 23, bind-receiving module 25 receives the data packet from the peer side device according to the bind-sending rule of the peer side device.

The forgoing is only preferred embodiments of the process and method of the present invention and is not intended to limit the present invention. Any modification, equivalent replacement, and improvement made within the spirit and principle of this invention should be covered by the protection scope as defined by the appended claims.

What is claimed is:

1. A method for binding transmission lines, comprising:
deciding, by a broadband access device, a transmission speed supported by all the transmission lines to be bound, wherein all the transmission lines to be bound are digital-subscriber-line (DSL) transmission lines that correspond to a same DSL interface provided for a user by the broadband access device;

activating, by the broadband access device, all the transmission lines to be bound at the transmission speed supported by all the transmission lines, and binding all the transmission lines;

sending, by the broadband access device, data to a peer side device via the bound transmission lines according to a first bind-sending rule; and receiving, by the broadband access device, data via the bound transmission lines from the peer side device according to a second bind-sending rule stored in the broadband access device;

wherein the first bind-sending rule is different from the second bind-sending rule.

2. The method of claim 1, wherein the step of deciding, by the broadband access device, a transmission speed supported by all the transmission lines comprises:

obtaining, by the broadband access device, the current activated speeds of all the transmission lines which have been activated and are to be bound, selecting, by the broadband access device, the lowest activated speed from the current activated speeds of all the transmission lines and determining the lowest activated speed as the transmission speed supported by all the transmission lines.

3. The method of claim 2, wherein each one of the activated speeds of all the transmission lines comprises an upstream bandwidth and a downstream bandwidth of the corresponding one of all the transmission lines.

4. The method of claim 1, wherein the step of activating, by the broadband access device, all the transmission lines at the transmission speed supported by all the transmission lines comprises:

activating, by the broadband access device, all the transmission lines at the transmission speed supported by all the transmission lines according to a line profile of the transmission speed supported by all the transmission lines to be bound.

5. The method of claim 1, wherein one of the first and second bind-sending rules is preset as using each of the bound transmission lines in turn for data transmission.

6. A method for transmitting binding transmission lines, comprising:

deciding, by a broadband access device, a transmission speed supported by all the transmission lines to be bound;

activating, by the broadband access device, all the transmission lines to be bound at the transmission speed supported by all the transmission lines, and binding all the transmission lines;

sending, by the broadband access device, a first data packet via a downward line selected from the bound transmission lines according to a first bind-sending rule; and receiving, by the broadband access device, a second data packet via an upward line selected from the bound transmission lines according to a second bind-sending rule stored in the broadband access device, wherein the second bind-sending rule is different from the first bind-sending rule, wherein all the transmission lines to be bound are digital-subscriber-line (DSL) transmission lines, that correspond to a same DSL interface provided for a user by the broadband access device.

7. The method of claim 6, wherein the step of deciding, by the broadband access device, a transmission speed supported by all the transmission lines comprises:

obtaining, by the broadband access device, the current activated speeds of all the transmission lines which have been activated, selecting, by the broadband access device, the lowest activated speed from the current activated speeds of all the transmission lines;

wherein the lowest activated speed is configured as the transmission speed supported by all the transmission lines.

8. The method of claim 6, wherein the step of activating, by the broadband access device, all the transmission lines at the transmission speed supported by all the transmission lines comprises:

activating, by the broadband access device, all the transmission lines at the transmission speed supported by all the transmission lines according to a line profile of the transmission speed supported by all the transmission lines to be bound.

9. The method of claim 6, wherein one of the first and second bind-sending rules is preset as using each of the bound transmission lines in turn for data transmission.

* * * * *